United States Patent [19]

Gibler

[11] Patent Number: 5,177,297
[45] Date of Patent: Jan. 5, 1993

[54] METHOD OF REMOVING A POLYMERIZATION CATALYST

[75] Inventor: Carma J. Gibler, Houston, Tex.

[73] Assignee: Shell Oil Company, Houston, Tex.

[21] Appl. No.: 785,579

[22] Filed: Oct. 30, 1991

[51] Int. Cl.⁵ .......................... C07C 7/12; C07C 7/00; C08F 6/00

[52] U.S. Cl. .................... 585/823; 585/855; 585/868; 528/488; 528/490

[58] Field of Search .......... 585/823, 855, 868; 528/488, 490

[56] References Cited

U.S. PATENT DOCUMENTS 4,855,509  8/1989  Dave et al. ................... 568/621
5,104,972  4/1992  Madgavkar et al. ............ 528/488

FOREIGN PATENT DOCUMENTS 56010527  9/1979  Japan .

Primary Examiner—Anthony McFarlane
Assistant Examiner—Nhat D. Phan
Attorney, Agent, or Firm—Donald F. Haas

[57] ABSTRACT

A process for separating lithium from a conjugated diolefin polymer wherein a solution containing said conjugated diolefin polymer and a lithium compound is contacted with magnesium phosphate, magnesium phosphate dibasic, magnesium dihydrogen phosphate or a mixture thereof. Preferably, the magnesium phosphate compound is selected from the group consisting of mono- and dihydrogen phosphates. Most preferably, the magnesium phosphate is magnesium phosphate dibasic. The magnesium phosphate, magnesium phosphate dibasic, magnesium phosphate or mixture thereof may be used in combination with water and/or methanol with relatively good results. The lithium, which is a polymerization catalyst, can be removed immediately after the conjugated diolefin polymer is prepared by contacting the polymer solution with the magnesium phosphate compound.

10 Claims, No Drawings

METHOD OF REMOVING A POLYMERIZATION CATALYST

BACKGROUND OF THE INVENTION

1. Field of the Invention

This invention relates to a process for separating a polymerization catalyst from a polymer. More particularly, this invention relates to a method for removing certain lithium compounds from a polymer comprising a conjugated diolefin and/or a monoalkenyl aromatic hydrocarbon compound.

2. Prior Art

Heretofore, several methods have been proposed for separating lithium compounds from a polymer, particularly a conjugated diolefin polymer. In general, these methods involve contacting the polymer and lithium containing composition with water and/or an acid. A principal problem associated with these methods is that each introduces an impurity to the polymer which must be removed before the polymer is suitable for at least most end use applications. These methods, then, add a rather complicated separation step to the processes. While the separation processes may be reasonably successful they frequently result in at least a small amount of impurity in the polymer composition. Also, the separation step is a rather complicated step in preparing the polymer composition for its various end use applications. The need, then, for a process which will separate certain lithium compounds from a polymer comprising a conjugated diolefin and/or a monoalkenyl aromatic hydrocarbon compound without introducing impurities thereto and without introducing a complicated "cleanup" or purification step is believed to be readily apparent.

SUMMARY OF THE INVENTION

It has now been discovered that the foregoing and other disadvantages of the prior art processes for separating certain lithium compounds from a polymer comprising a conjugated diolefin and/or an aromatic hydrocarbon monomer can be avoided or at least significantly reduced with the method for separating certain lithium compounds of this invention and an improved process provided thereby. It is, therefore, an object of this invention to provide an improved process for separating certain lithium compounds from a polymer comprising a conjugated diolefin and/or an aromatic hydrocarbon monomer. It is another object of this invention to provide such an improved process wherein the certain lithium compounds are separated without introducing an impurity therein. It is another object of this invention to provide such an improved process wherein the certain lithium compounds can be separated with a reduced number of processing steps. The foregoing and other objects and advantages will become apparent from the description of the invention set forth hereinafter and from the examples included therein.

In accordance with the present invention, the foregoing and other objects and advantages are accomplished in a process wherein the certain lithium compounds are separate from the polymer comprising a conjugated diolefin and/or an aromatic hydrocarbon monomer by using a magnesium phosphate, to effect the separation. The magnesium phosphate compounds are, of course, solids and can readily be separated from the polymer composition by physical separation means or the polymer solution can be passed over or through a fixed bed of the magnesium phosphate compound. Such a separation will, of course, separate all of the solid compounds thereby leaving the polymer composition free of any impurities therein introduced as a result of the separation process.

DETAILED DESCRIPTION OF THE INVENTION

As indicated supra, the present invention is drawn to an improved process for separating certain lithium compounds from a polymer comprising a conjugated diolefin and/or an aromatic hydrocarbon monomer. As also indicated supra, the improved process involves the use of a magnesium phosphate compound to separate the certain lithium compounds from the polymer. As further indicated supra, the magnesium phosphate compounds are solids and can be separated from the polymer solution using any of the solid separation techniques known in the prior art. Such techniques include centrifugation, filtration and settling and a fixed bed of the magnesium phosphate compound could be used thereby totally eliminating the need for a separation step of any kind. The improved process for separating certain lithium compounds of this invention offers the advantage of producing a polymer free of any impurities introduced as a result of the lithium compound separation step and aside from a step required to separate the solid separation compound when the magnesium phosphate is combined with the polymer solution the process does not, really, introduce any additional steps to the processes known heretofore in the prior art.

A host of lithium compounds could be separated with the process of this invention, however lithium hydride, a lithium alkoxide or lithium hydroxide will most commonly be removed since these are the compounds to which the lithium catalyst is converted when the lithium catalyst is deactivated. Of these, the lithium alkoxide and particularly lithium methoxide are preferred. The magnesium phosphate compounds which can be used in the process of this invention include magnesium phosphate, magnesium monohydrogen phosphate, magnesium dihydrogen phosphate and mixtures thereof. For convenience, magnesium mono-hydrogen phosphate will, frequently, be referred to herein as magnesium dibasic.

In general, the polymer will be present in a suitable solvent at a concentration within the range from about 1 to about 50 weight percent, based on total solution, and the lithium and certain lithium compounds will be present at a concentration within the range from about 25 to about 5000 ppm based on polymer. In general, the contacting will be accomplished at a temperature within the range from about 25° to about 120° C., a pressure within the range from about 10 to about 1200 psig and at a nominal holding time within the range from about 10 to about 240 minutes.

In general, the method of this invention can be used to separate lithium compounds from any polymer comprising a conjugated diolefin and/or an aromatic hydrocarbon monomer known in the prior art which is prepared with a lithium compound catalyst. Such polymers may be linear, branched, block or radial. Such polymers include polymers containing one or more conjugated diolefins and polymers containing one or more conjugated diolefins and any one or more monomers which will copolymerize therewith such as vinyl aryl compounds and polymers containing such monomers using a lithium compound catalyst. In general, the conjugated diolefin will contain from about 4 to about 12 carbon atoms such as 1,3-butadiene, isoprene, piperylene, methylpentadiene, phenylbutadiene, 3,4-dimethyl-1,3-hexadiene, 4,5-diethyl-1,3-octadiene and the like and the other monomers such as vinyl arene compounds, particularly monoalkenyl aromatic compounds, such as styrene, various alkyl substituted styrenes such as alphamethylstyrene, ethyl styrene and the like, paralkoxystyrenes such as paramethoxystyrene, ethoxystyrene and the like, vinylnapthalene, vinyltoluene and the like. The polymer may be hydrogenated or neat although again, generally, it would be desirable to separate the lithium compounds prior to hydrogenation.

As indicated supra, the polymer will be in solution when the lithium compounds are removed. Preferably, the polymer will be in the same solvent as it was prepared but, as a practical matter, essentially any suitable hydrocarbon could be used to place the polymer in solution. Suitable solvents include, but are not limited to, hydrocarbons such as paraffins, cycloparaffins, alkyl substituted cycloparaffins, aromatics and alkyl substituted aromatics containing from 4 to about 10 carbon atoms per molecule. Suitable solvents include benzene, toluene, cyclohexane, methylcyclohexane, n-butane, n-hexane, n-heptane and the like. As is well known, the polymer could be prepared in any one or more of these solvents or the solvent used for preparation could be separated using suitable means and the polymer then dissolved in any other suitable solvent.

As indicated supra, the lithium compounds will be separated by contacting with magnesium phosphate and/or a mono- or dihydrogen magnesium phosphate. In general, the phosphate will be used at a concentration within the range from about 0.2 to about 10 wt % based on solution. It will, of course, be appreciated that the higher phosphate concentrations will be most effective and would, generally, lead to the use of shorter contacting times. The lithium compounds may be in solution or suspended during the separation process.

As indicated supra, after contacting with the magnesium phosphate, magnesium phosphate dibasic or magnesium dihydrogen phosphate is completed the magnesium compounds will be separated by a centrifugal means, filtration means or settling means or the polymer solution may be passed over a fixed bed of the magnesium phosphate compound or compounds thereby avoiding the need for a separation step of any kind. Useful centrifugal means include centrifuges and cyclones. Filtration may be accomplished using rotary or fixed filtration beds. Decantation or sedimentation in parallel plate separators may also be used to separate the magnesium compound from the polymer solution. Filtering utilizing a filter aid is preferred because this method is known to be effective to separate fine particles from polymer solution and a reaction product of the lithium compound and the magnesium phosphate, magnesium phosphate dibasic and/or magnesium dihydrogen phosphate compound will, generally, be fine particles.

Interestingly, water and alcohols can be used to enhance the separation. When an alcohol such as methanol, is used, lithium compounds such as lithium hydride, lithium hydroxide and lithium alkyls will be converted to the corresponding lithium alkoxide. This has an added advantage of converting harder to separate lithium hydride, lithium hydroxide and lithium alkyls to the more readily separated lithium alkoxide. When water is used, it will, generally, be used at a concentration within the range from about 1 to about 500 mols water per mol of lithium compound and when an alcohol is used it will, generally, be used at a concentration within the range from about 1 to about 40 mols alcohol per mol of lithium compound. The water and alcohol could be used together, but as a practical matter this will not generally be done since the water seems to reduce the effectiveness of the alcohol.

PREFERRED EMBODIMENT

In a preferred embodiment of the present invention, magnesium phosphate dibasic will be used to separate lithium methoxide from a conjugated diolefin polymer. In the preferred embodiment, the conjugated diolefin polymer will be a block copolymer comprising a conjugated diolefin monomer block and an aromatic hydrocarbon polymer block. In a most preferred embodiment, the conjugated diolefin polymer block will be of either isoprene or butadiene and the aromatic hydrocarbon polymer block will be styrene. In the preferred embodiment, the polymer solution will be diluted to a polymer concentration within the range from about 10 to about 20 weight percent polymer based on total solution.

In the preferred embodiment of this invention, the contacting between the magnesium phosphate dibasic and the lithium methoxide will be accomplished at a temperature within the range from about 25° to about 90° C., a total pressure within the range from about 10 to about 100 psig and at a nominal holding time within the range from about 10 to about 60 minutes. The magnesium phosphate dibasic will be used at a concentration within the range ranging from about 0.7 to about 2.0 weight percent based on total solution. In the preferred embodiment of this invention, the lithium methoxide will be present at a concentration within the range ranging from about 500 to about 10,000 ppm based on polymer.

It will, of course, be appreciated that a host of lithium compounds could be converted to lithium methoxide using techniques well known in the prior art. It is, then, within the preferred embodiment of this invention to effect the conversion of essentially any lithium compound that may be present during the polymerization of a conjugated diolefin polymer with a lithium compound to lithium methoxide. This can, generally, be accomplished by reacting the lithium compound such as lithium hydride or a lithium alkyl with methanol.

Having thus broadly described the present invention and a preferred and most preferred embodiment thereof, it is believed that the invention will become even more apparent by reference to the following examples. It will be appreciated, however, that the examples are presented solely for purposes of illustration and should not be construed as limiting the invention.

EXAMPLES

Example 1

In this example, magnesium phosphate dibasic was used to separate lithium methoxide from a block copolymer solution comprising a butadiene-styrene-butadiene block copolymer having a weight average molecular weight of 49,700. The polymer was prepared in a solvent mixture of cyclohexane and diethylether. The solution was diluted to 10 weight percent polymer with cyclohexane prior to adding the magnesium phosphate dibasic. The feedstock contained 160 parts per million lithium based on polymer. The contacting between the magnesium phosphate dibasic and the lithium methoxide containing polymer solution was effected at a temperature of 25° C., at atmospheric pressure and at a holding time of 1 hour. Three different concentrations of magnesium phosphate dibasic were used in this example. The three concentrations used were 10 weight percent, 2 weight percent and 0.7 weight percent all based on solution. After 1 hour, the polymer solution was separated from the adsorbent, dried and analyzed for lithium content and the amount of lithium removed determined. In the three respective cases of this example, the amount of lithium removed was 99.4%, 98.1% and 80.6%. This example clearly reflects that the larger concentrations of magnesium phosphate dibasic are most effective at 1 hour.

Example 2

In this example, the procedure of Example 1 was repeated except that the contacting time was extended to 3 days. The results then obtained for the 3 respective samples were 98.0%, 86.9% and 98.8% lithium removed. This example reflects less dependence on the concentration of adsorbant with the 10% and 0.7% samples yielding substantially the same result with the result of the 2% sample being somewhat out of line with what would have been expected. The reasons for this discrepancy are not known.

Example 3

In this example, the procedure of Example 1 was repeated except that lithium hydride was substituted for the lithium methoxide and the concentration of lithium was increased to 170 parts per million based on polymer and the weight average molecular weight of the polymer reduced to 44,100. Lithium hydride is obtained by hydrogen termination of the polymer whereas lithium methoxide is obtained by methanol termination of the polymer. The amounts of adsorbant and the contacting time actually used were identical to those set forth in Example 1. After the 1 hour contacting time was completed the polymer sample was analyzed for lithium and the amount of lithium removed determined. In each of the three respective samples the amount of lithium removed was 88.2%, 52.4% and 5.9%. This example again emphasizes the importance of adsorbant concentration when the contacting time is only 1 hour.

Example 4

In this example, the procedure of Example 3 was repeated except that the holding time was increased from 1 hour to 3 days. After completion of the run, the polymer solution was analyzed for lithium concentration and the amount of lithium removed in each of the three respective runs was found to be 95.7%, 81.8% and 95.1%. This example again suggests that the concentration of adsorbant is less important when the holding time is extended to three days and the second run; i.e., the run completed with 2 weight percent adsorbant was out of line with the other two results which were substantially the same.

Example 5

In this example, magnesium phosphate dibasic was used to separate lithium hydride from a styrene-butadiene-styrene block copolymer, in effect, as prepared. The polymer had a weight average molecular weight of 52,300. The polymer was prepared in cyclohexane and diethyl ether and the concentration of polymer in solution was reduced to 10 weight percent based on total solution by adding additional cyclohexane. The polymer feed solution contained 16 ppm lithium based on solution. The contacting was accomplished at a temperature of 25° C., atmospheric pressure and, in this example, at a nominal holding time of 1 hour. Three runs were completed in this example at different adsorbant concentrations. In this example, the adsorbant was used at concentrations of 10 weight percent, 2 weight percent and 0.67 weight percent all based on solution. After the 1 hour contacting was completed, the polymer solution was separated from the adsorbent, the solution was analyzed for lithium concentration and the amount of lithium actually removed determined. In the three runs completed in this example, the amount of lithium removed was determined to be, respectively, 37.5%, 6.3% and 6.3%. This example again emphasizes the importance of adsorbent concentration and suggest that lithium hydride removal can vary with feed since lithium hydride is not effectively separated from a polymer solution as prepared in 1 hour.

Example 6

In this example, the three runs of Example 5 were repeated except that the contacting time was extended to three days. After the three day contacting time, the polymer solution was separated from the adsorbent, was analyzed for lithium content and the amount of lithium removed actually determined. The result actually obtained were, respectively, 74.7%, 29.4% and 23.5%. This example suggests that longer holding times are effective in removing an increased amount of lithium hydride though the amount actually removed, especially at the lower adsorbant concentrations would not be commercially acceptable.

Example 7

In this example, the three runs completed in Example 5 were repeated except that water at a concentration of 480 moles water per mole of lithium was added. After completion of the 1 hour contacting time, the polymer solution was separated from the adsorbent, was again analyzed to determine the amount of lithium remaining and the amount of lithium actually removed, determined. In this example, the amounts of lithium actually removed were, respectively, 78.1%, 25.0% and 25.0%. As will be apparent from a comparison of this example with the results of Example 5, water did improve the amount of lithium separated but, especially, at the lower concentrations the amount removed would not be acceptable commercially.

Example 8

In this example, the three runs of Example 5 were repeated except that 27 moles of methanol per mole of lithium were added. After the 1 hour contacting time, the polymer solution was separated from the adsorbent, was analyzed for remaining lithium content and the amount of lithium removed actually determined. The results obtained in this example were, respectively, 97.4%, 85.0% and 87.5%. As will be apparent from the data obtained in this example, methanol significantly increases the amount of lithium separated and even at 1 hour the amounts separated would be acceptable commercially even at the lower adsorbant concentrations.

Example 9

In this example, the runs of Example 8 were repeated except that the contacting time was increased from 1 hour to 3 days. After the 3 day contacting period, the polymer solution was separated from the adsorbent, was analyzed for remaining lithium and the amount of lithium actually removed determined. In this example, the results actually achieved were, respectively, 99.9%, 95.9% and 91.8%. As will again be apparent from these results, methanol significantly improves or increases the amount of lithium hydride separated. This is probably due to a reaction of the lithium hydride with methanol to form lithium methoxide.

Example 10

In this example, the runs of Example 5 were repeated except that a mixture of water and methanol was added to the adsorption mixture. The water was added at a concentration of 480 moles of water per mole of lithium and the methanol was added at a concentration of 27 moles of methanol per mole of lithium. After the 1 hour holding time, the polymer solution was sampled to determine the amount of lithium remaining and the amount of lithium removed determined. The results obtained in this example were, respectively, 92.5%, 70.0% and 50.6%. As will be apparent from a comparison of this example and Example 8, the water reduces the effectiveness of methanol in separating the lithium hydride.

Example 11

In this example, the runs of Example 6 were repeated except that a mixture of water and methanol were added to the adsorption mixture. The water and methanol were added at the same concentration as was used in Example 10. After the 3 day adsorption period, the polymer solution was analyzed to determine the amount of remaining lithium and the amount of lithium removed actually determined. The results actually obtained were, respectively, 94.5%, 87.1% and 84.7%. As again will be apparent by comparing the results of this example with the results of Example 9, the water reduced the effectiveness of the methanol in separating the lithium hydride.

While the present invention has been described and illustrated by reference to particular embodiments thereof, it will be appreciated by those of ordinary skill in the art that the same lends itself to variations not necessarily described or illustrated herein. For this reason, reference should be made solely to the appended claims for purposes of determining the true scope of the present invention.

Having thus described and illustrated the invention what is claimed is:

1. A process for separating lithium from a conjugated diolefin polymer comprising the steps of:
   (a) contacting a polymer solution containing the conjugated diolefin polymer and a lithium compound with magnesium phosphate, magnesium phosphate dibasic, magnesium dihydrogen phosphate or mixtures thereof;
   (b) separating the magnesium phosphate, magnesium phosphate dibasic, other magnesium dihydrogen phosphate or mixture thereof from the polymer solution; and
   (c) recovering a conjugated diolefin polymer containing a reduced amount of lithium therein.

2. The process of claim 1 wherein the nominal contacting time in step (a) is within the range from about 10 to about 240 minutes.

3. The process of claim 1 wherein said conjugated diolefin polymer is a copolymer comprising a conjugated diolefin and an aromatic hydrocarbon monomer.

4. The process of claim 1 wherein the separation of the magnesium phosphate, magnesium phosphate dibasic, magnesium dihydrogen phosphate or mixture thereof is accomplished using physical separation techniques.

5. The process of claim 1 wherein said conjugated diolefin polymer is a block copolymer comprising a butadiene or isoprene polymer block and a styrene polymer block.

6. The process of claim 1 wherein said polymer solution is passed over a fixed bed of magnesium phosphate, magnesium dibasic, magnesium dihydrogen phosphate or mixture thereof.

7. The process of claim 1 wherein the concentration of said conjugated diolefin polymer is within the range of about 1 to about 50 weight percent based on total solution.

8. The process of claim 1 wherein the concentration of said magnesium phosphate, magnesium phosphate dibasic, magnesium dihydrogen phosphate or mixture thereof is within the range from about 0.2 to about 10 weight percent based on solution.

9. The process of claim 1 wherein methanol is used in combination with said magnesium phosphate, magnesium phosphate dibasic, magnesium dihydrogen phosphate or mixture thereof.

10. The process of claim 1 wherein water is used in combination with said magnesium phosphate, magnesium phosphate dibasic, magnesium dihydrogen phosphate or mixture thereof.

* * * * *